US010469332B2

(12) United States Patent
Kulkarni et al.

(10) Patent No.: US 10,469,332 B2
(45) Date of Patent: Nov. 5, 2019

(54) METHOD AND APPARATUS OF REMOTE CONFIGURATION AND MANAGEMENT OF WIRELESS NODES

(71) Applicant: Marvell World Trade Ltd., St. Michael (BB)

(72) Inventors: Anup Kulkarni, Santa Clara, CA (US); Frank Huang, Dublin, CA (US); Muhammad Jawad Haider, Santa Clara, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 32 days.

(21) Appl. No.: 15/688,606

(22) Filed: Aug. 28, 2017

(65) Prior Publication Data

US 2018/0062939 A1  Mar. 1, 2018

Related U.S. Application Data

(60) Provisional application No. 62/379,924, filed on Aug. 26, 2016, provisional application No. 62/381,935, filed on Aug. 31, 2016.

(51) Int. Cl.
*H04L 12/24* (2006.01)
*G06F 3/0481* (2013.01)
(Continued)

(52) U.S. Cl.
CPC ............ *H04L 41/22* (2013.01); *G06F 3/0482* (2013.01); *G06F 3/0486* (2013.01);
(Continued)

(58) Field of Classification Search
CPC .. H04L 41/22; H04L 41/0806; H04L 41/0889
See application file for complete search history.

(56) References Cited

U.S. PATENT DOCUMENTS 5,708,655 A   1/1998 Toth et al.
6,580,700 B1  6/2003 Pinard et al.
(Continued)

FOREIGN PATENT DOCUMENTS

WO   WO-2010083887 A1   7/2010

OTHER PUBLICATIONS

"Dynamic Host Configuration Protocol", Wikipedia, downloaded from the Internet, https://en.wikipedia.org/wiki/Dynamic_Host_Configuration_Protocol, Nov. 2, 2015, 19 pages.
(Continued)

*Primary Examiner* — Parth Patel

(57) ABSTRACT

Systems and techniques relating to wireless networking systems and techniques, namely remotely managing, configuring, visualizing, and interacting with wireless nodes, include: determining a transport medium usable for communication of a discovery message via a wireless network, wherein the discovery message is formatted according to a protocol; transmitting one or more discovery messages using the determined transport medium; receiving one or more response messages associated with the one or more discovery messages, wherein each of the one or more response messages includes (i) information indicating the wireless association, wherein the wireless association is between a wireless device corresponding to the response message and at least one other wireless device accessible via the wireless network, and (ii) triangulation parameters; and determining a network topology of the wireless network based on the one or more response messages.

15 Claims, 4 Drawing Sheets

(51) Int. Cl.
*G06F 3/0482* (2013.01)
*G06F 3/0484* (2013.01)
*G06F 3/0486* (2013.01)
*G06F 3/0488* (2013.01)
*H04W 48/08* (2009.01)
*H04W 84/12* (2009.01)

(52) U.S. Cl.
CPC ...... *G06F 3/04817* (2013.01); *G06F 3/04842* (2013.01); *G06F 3/04886* (2013.01); *H04L 41/0806* (2013.01); *H04L 41/0889* (2013.01); *H04L 41/12* (2013.01); *H04W 48/08* (2013.01); *H04W 84/12* (2013.01)

(56) References Cited

U.S. PATENT DOCUMENTS

| | | | |
|---|---|---|---|
| 6,728,232 | B2 | 4/2004 | Hasty, Jr. et al. |
| 6,993,583 | B2 | 1/2006 | Anderson et al. |
| 7,660,258 | B2 | 2/2010 | Cho et al. |
| 7,793,005 | B1 | 9/2010 | Fernald et al. |
| 8,006,276 | B2 | 8/2011 | Nakagawa et al. |
| 8,036,520 | B2 | 10/2011 | Narukawa et al. |
| 8,095,671 | B2 | 1/2012 | Balogh |
| 8,102,826 | B2 | 1/2012 | Lee |
| 8,116,233 | B2 | 2/2012 | Lambert et al. |
| 8,166,296 | B2 | 4/2012 | Buer et al. |
| 8,238,315 | B2 | 8/2012 | Lambert |
| 8,364,831 | B2 | 1/2013 | Balogh |
| 8,392,850 | B2 | 3/2013 | Nakagawa et al. |
| 8,446,843 | B2 | 5/2013 | Lambert |
| 8,451,862 | B2 | 5/2013 | Huang et al. |
| 8,732,283 | B2 | 5/2014 | Lambert et al. |
| 8,812,723 | B2 | 8/2014 | Lambert et al. |
| 8,886,833 | B1 | 11/2014 | Kopikare et al. |
| 9,055,430 | B2 | 6/2015 | Lambert |
| 9,137,255 | B2 | 9/2015 | Lambert |
| 9,226,337 | B1* | 12/2015 | Kopikare ............... H04W 8/005 |
| 9,571,199 | B1 | 2/2017 | Bannon et al. |
| 9,681,374 | B2 | 6/2017 | Cui et al. |
| 9,756,682 | B2 | 9/2017 | Iyer et al. |
| 9,819,901 | B1 | 11/2017 | Zhu et al. |
| 10,051,688 | B1 | 8/2018 | Huang et al. |
| 10,172,180 | B1 | 1/2019 | Huang et al. |
| 2001/0003191 | A1 | 6/2001 | Kovacs et al. |
| 2003/0081578 | A1 | 5/2003 | White et al. |
| 2004/0213271 | A1 | 10/2004 | Lovy et al. |
| 2004/0240474 | A1 | 12/2004 | Fan |
| 2005/0188069 | A1 | 8/2005 | Mohandas |
| 2005/0191990 | A1 | 9/2005 | Willey et al. |
| 2006/0256717 | A1 | 11/2006 | Caci |
| 2006/0267936 | A1 | 11/2006 | Hoerl et al. |
| 2006/0268749 | A1* | 11/2006 | Rahman ............... H04L 45/02 370/256 |
| 2006/0280131 | A1* | 12/2006 | Rahman ............... H04L 45/02 370/256 |
| 2007/0204021 | A1 | 8/2007 | Ekl et al. |
| 2007/0245033 | A1* | 10/2007 | Gavrilescu ........ H04L 29/12801 709/230 |
| 2008/0205649 | A1 | 8/2008 | Harris et al. |
| 2009/0190553 | A1* | 7/2009 | Masuda ................ H04W 8/005 370/331 |
| 2009/0234910 | A1 | 9/2009 | Chung et al. |
| 2010/0031318 | A1 | 2/2010 | Gardcia et al. |
| 2010/0054154 | A1 | 3/2010 | Lambert et al. |
| 2010/0057827 | A1* | 3/2010 | Tawfik .................. H04L 67/16 709/201 |
| 2010/0067509 | A1 | 3/2010 | Lambert |
| 2010/0296441 | A1 | 11/2010 | Barkan |
| 2011/0103302 | A1 | 5/2011 | Hall |
| 2011/0208359 | A1* | 8/2011 | Duchene ............... G05B 15/02 700/275 |
| 2011/0268127 | A1* | 11/2011 | Dhar ................... H04L 12/4641 370/401 |
| 2011/0282998 | A1 | 11/2011 | Johnsson et al. |
| 2011/0292922 | A1 | 12/2011 | Yang |
| 2012/0314621 | A1 | 12/2012 | Finn et al. |
| 2013/0170435 | A1 | 7/2013 | Dinan |
| 2013/0250810 | A1* | 9/2013 | Ho ......................... H04L 41/12 370/255 |
| 2013/0338941 | A1* | 12/2013 | Lin ....................... G01N 29/348 702/39 |
| 2014/0050209 | A1 | 2/2014 | Bajko et al. |
| 2014/0118143 | A1* | 5/2014 | Monacos ............. G08B 25/016 340/539.13 |
| 2014/0133355 | A1* | 5/2014 | Shu ........................ H04W 48/16 370/254 |
| 2014/0169222 | A1* | 6/2014 | Cohen ................... H04W 84/22 370/255 |
| 2014/0229634 | A1 | 8/2014 | Lambert et al. |
| 2014/0269476 | A1 | 9/2014 | Weston et al. |
| 2015/0195198 | A1 | 7/2015 | Shin et al. |
| 2015/0230155 | A1* | 8/2015 | Jeong ................... H04W 48/16 370/254 |
| 2015/0281947 | A1 | 10/2015 | Patil et al. |
| 2015/0351145 | A1* | 12/2015 | Burks .................... G08C 17/02 455/41.3 |
| 2016/0057234 | A1* | 2/2016 | Parikh .................... H04L 67/16 709/226 |
| 2016/0073336 | A1* | 3/2016 | Geller ................... H04W 48/20 455/434 |
| 2016/0112947 | A1 | 4/2016 | Sahoo et al. |
| 2016/0344681 | A1 | 11/2016 | Lambert et al. |
| 2017/0079044 | A1* | 3/2017 | Zhu ..................... H04W 72/0493 |
| 2017/0111153 | A1* | 4/2017 | Scholten ............... H04L 5/0053 |
| 2017/0171045 | A1* | 6/2017 | Ly ........................ H04L 69/326 |
| 2017/0171111 | A1 | 6/2017 | Khare et al. |
| 2017/0180973 | A1* | 6/2017 | Nakamichi ........... H04W 76/10 |
| 2017/0334522 | A1* | 11/2017 | Zahid .................... B62M 25/08 |
| 2018/0374126 | A1* | 12/2018 | Patil ..................... G06Q 30/0241 |

OTHER PUBLICATIONS

"IEEE 802.11", Wikipedia, downloaded from the internet, https://en.wikipedia.org/wiki/IEEE_802.11, Nov. 16, 2015, 13 Pages.

"IEEE 802.11 ai", Wikipedia, downloaded from the internet, https://en.wikipedia.org/wiki/IEEE_802.11ai, Nov. 2, 2015, 1 page.

"IEEE P802.11—Task Group AI—Meeting Update", IEEE P802.11 FIA Study Group, downloaded from the internet http://www.ieee802.org/11/Reports/tgai_updated.htm, Nov. 2, 2015, 29 pages.

Chen et al., "Scalable Address Allocation Protocol for Mobile Ad Hoc Networks," 2009, Fifth International Conference on Mobile Ad-hoc and Sensor Networks, IEEE Computer Society, 41-48, 8 pages.

IBSS with Wi-Fi Protected Setup Technical Specjfication.v.1.0.0, Wi-Fi Alliance technical Committee IBSS with Wi-Fi Protected Setup Technical Task Group, 2012, 76 pages.

Johnson, et al., "Subnet Allocation Option" Internet Engineering Task Force, Internet Soceity (ISOC), May 13, 2010, pp. 1-30.

Mohsin et al., "IP address assignment in a mobile ad hoc network", IEEE Military Communications Conference, Oct. 7, 2022, pp. 856-861.

U.S. Appl. No. 15/153,666, Office Action dated Nov. 3, 2017, 15 pages.

U.S. Appl. No. 15/166,188, Office Action dated Dec. 6, 2017, 12 pages.

* cited by examiner

| Cmd_id 205 | Seq_num 210 | Sub_id 215 | Status 220 | Length 225 | Command specific data based on cmd_id 230 |

| Cmd_id 255 | Seq_num 260 | Sub_id 265 | Status 270 | Length 275 | Command specific response data based on cmd_id 280 |

METHOD AND APPARATUS OF REMOTE CONFIGURATION AND MANAGEMENT OF WIRELESS NODES

CROSS REFERENCE TO RELATED APPLICATION

This disclosure claims the benefit of the priority of U.S. Provisional Application Ser. No. 62/379,924 filed Aug. 26, 2016, entitled, "METHOD AND APPARATUS OF REMOTE CONFIGURATION AND MANAGEMENT OF WIRELESS NODES", which is incorporated herein by reference in its entirety.

This disclosure claims the benefit of the priority of U.S. Provisional Application Ser. No. 62/381,935 filed Aug. 31, 2016, entitled, "METHOD AND APPARATUS FOR INTERACTIVE WIRELESS NETWORK VISUALIZATION", which is incorporated herein by reference in its entirety.

This application is related to U.S. patent application Ser. No. 15/166,188 entitled "BRIDGING WIRELESS NETWORK TRAFFIC", filed May 26, 2016, which is incorporated herein by reference in its entirety.

This application is related to U.S. patent application Ser. No. 15/245,654 entitled "CONFIGURING NETWORK CONNECTIONS", filed Aug. 24, 2016, which is incorporated herein by reference in its entirety.

BACKGROUND

This disclosure relates to wireless networking systems and techniques, namely remotely managing, configuring, visualizing, and interacting with wireless nodes. The techniques disclosed within this disclosure can be used in wireless networks that employ a bridge topology for Dynamic Multi Hop Relay (DMHR) in addition to other 802.11 wireless communication technologies mentioned herein.

Wireless communication, particularly wireless local area network (WLAN) technology, has become ubiquitous in the mobile computing environment. Some existing wireless networking standards, for example, Wi-Fi protocol IEEE (Institute of Electrical and Electronics Engineers) 802.11 can be used to provide close-proximity wireless connectivity between wireless devices. As an example, Wi-Fi routers operating on the traditional 2.4 GHz band can reach up to 150 feet (46 m) indoors and 300 feet (92 m) outdoors. In some cases, 802.11a devices running at 5 GHz can reach approximately one-third of these distances.

Additionally, newer wireless networking technologies, such as 802.11ah, have been developed that are capable of operating at longer ranges and having comparatively lower device power consumption than some existing wireless systems. These long range, low power (LRLP) wireless technologies are usable to extend the communication range that is achieved with some legacy 802.11 wireless technologies, such as Wi-Fi and Bluetooth. For example, LRLP technology potentially improves wireless communication range strength by approximately 10 dbB and distance by approximately 500 m over some other existing wireless networking standards. There are some wireless networking environments that have operational concerns of longer ranges (e.g., kilometers) and longer battery life (e.g., years), rather than the high data rates associated with shorter-range wireless systems, that makes LPLR capabilities more suitable. An example of such environment is the Internet of Things (IoT), which extends networking capabilities to varying physical objects (e.g., vehicles, medical devices, buildings,) implemented using embedded sensors and actuators, for example.

With advancements in wireless communication systems, there are many emerging possibilities for the devices on the network to form various different types of topologies in order to achieve various use cases. Some existing 802.11 network topologies require use of a central entity, called an Access Point (AP). The AP is utilized to provide Internet access to the connected 802.11 nodes. Thus, a network topology utilizing an AP can be unintentionally restricted to the AP's connectivity range. For example, the wireless nodes that an AP can reach may be limited by the physical layer operating conditions (e.g., physical obstacles such as walls, moving objects etc). Due to various limitations, a range for an AP may not allow wireless connections to reach all available wireless nodes, even wireless nodes that are located within range of a wireless networking area. An airport display system could be one such use case, where the range of a single AP may not be reachable for all of the display nodes in the airport. Therefore, it may be desirable to implement techniques that utilize a network topology which further leverages longer range functionality of wireless technologies, while maintaining an acceptable latency.

Moreover, some existing 802.11 technologies are conventionally used for single-hop communication. This can cause difficulties for a network administrator to control and configure the wireless device which are physically located beyond the range which AP could cater.

SUMMARY

This disclosure relates to wireless networking systems and techniques, namely remotely managing, configuring, visualizing, and interacting with wireless nodes. The techniques disclosed within this disclosure can be used in wireless networks that employ a bridge topology for Dynamic Multi Hop Relay (DMHR) in addition to other wireless communication technologies mentioned herein.

According to an aspect of the described systems and techniques, a method includes: determining a transport medium usable for communication of a discovery message via a wireless network, wherein the discovery message is formatted according to a protocol; transmitting one or more discovery messages using the determined transport medium; receiving one or more response messages associated with the one or more discovery messages, wherein each of the one or more response messages includes (i) information indicating the wireless association between a wireless device corresponding to the response message and at least one other wireless device accessible via the wireless network, and (ii) triangulation parameters; and determining a network topology of the wireless network based on the one or more response messages.

According to an aspect of the described systems and techniques, a system includes: a wireless local area network (WLAN); one or more wireless devices communicatively coupled with the WLAN; and a remote controller device communicatively coupled with the one or more wireless devices and programed to: determine a transport medium usable for communication of a discovery message, wherein the discovery message is formatted according to a protocol; transmit, to the one or more wireless devices, one or more discovery messages using the determined transport medium; receiving one or more response messages, from the one or more wireless device, associated with the one or more discovery messages, wherein each of the one or more response messages includes (i) information indicating a wireless association, wherein the wireless association is between a wireless device corresponding to the response message and at least one other wireless device accessible via the WLAN, and (ii) triangulation parameters; and determine a network topology of the WLAN based on the one or more response messages.

The described systems and techniques can result in one or more of the following advantages. The present disclosure describes devices, systems, and techniques for a wireless network to implement a wireless network bridge (also referred to as bridge or bridge device) to connect to a primary access point (AP) in a wireless network, and one or more devices that are outside of the range of the of direct connections to the AP, thereby realizing an extended wireless networking range for an AP. Also, the present disclosure describes mechanisms to enhance network management capabilities (e.g., configuration, management, control) for topologies that are configured for longer range functionality. These mechanisms are adapted for remotely interacting with devices in a network topology supported by the extended wireless networking range. For example, a user (or a network administrator) can use the disclosed mechanisms in order to interact, visualize, control and configure various wireless nodes which form the topology of a network utilizing a wireless network bridge. A remote control device, as described herein, can be used for interacting with the network topology from various locations that are remote from the wireless network, thereby further extended networking capabilities. Accordingly, the systems and techniques described herein provide advantages associated with the remote management and configuration of wireless nodes, remote visualization and interaction with the wireless nodes, and multi-hop control and configuration of the wireless nodes. Moroever, the present disclosure describes a protocol which is independent of transport medium.

BRIEF DESCRIPTION OF THE DRAWINGS

FIGS. 2A-2B show examples of frame formats for implementing the remote configuration and management techniques disclosed.

Like reference symbols in the various drawings indicate like elements.

DETAILED DESCRIPTION

This disclosure relates to wireless networking systems and techniques, namely remotely managing, configuring, visualizing, and interacting with wireless nodes. The techniques disclosed within this disclosure can be used in wireless networks that employ a bridge topology for Dynamic Multi Hop Relay (DMHR) in addition to other wireless communication technologies mentioned herein. For example, with adaptions, the disclosed systems and techniques can be employ to existing 802.11 technologies, such as 802.11 stations (STAs) and APs, 802.11s mesh nodes, and 802.11 Ad-Hoc STAs.

In this context, a wireless network as described in the following sections refers to a wireless local access network (WLAN) or a Wi-Fi network that is based on the IEEE 802.11 family of wireless protocols including necessary aspects for implementing DMHR. However, the systems and techniques disclosed herein can also be applied to wireless networks based on other communication standards.

Figure 3:
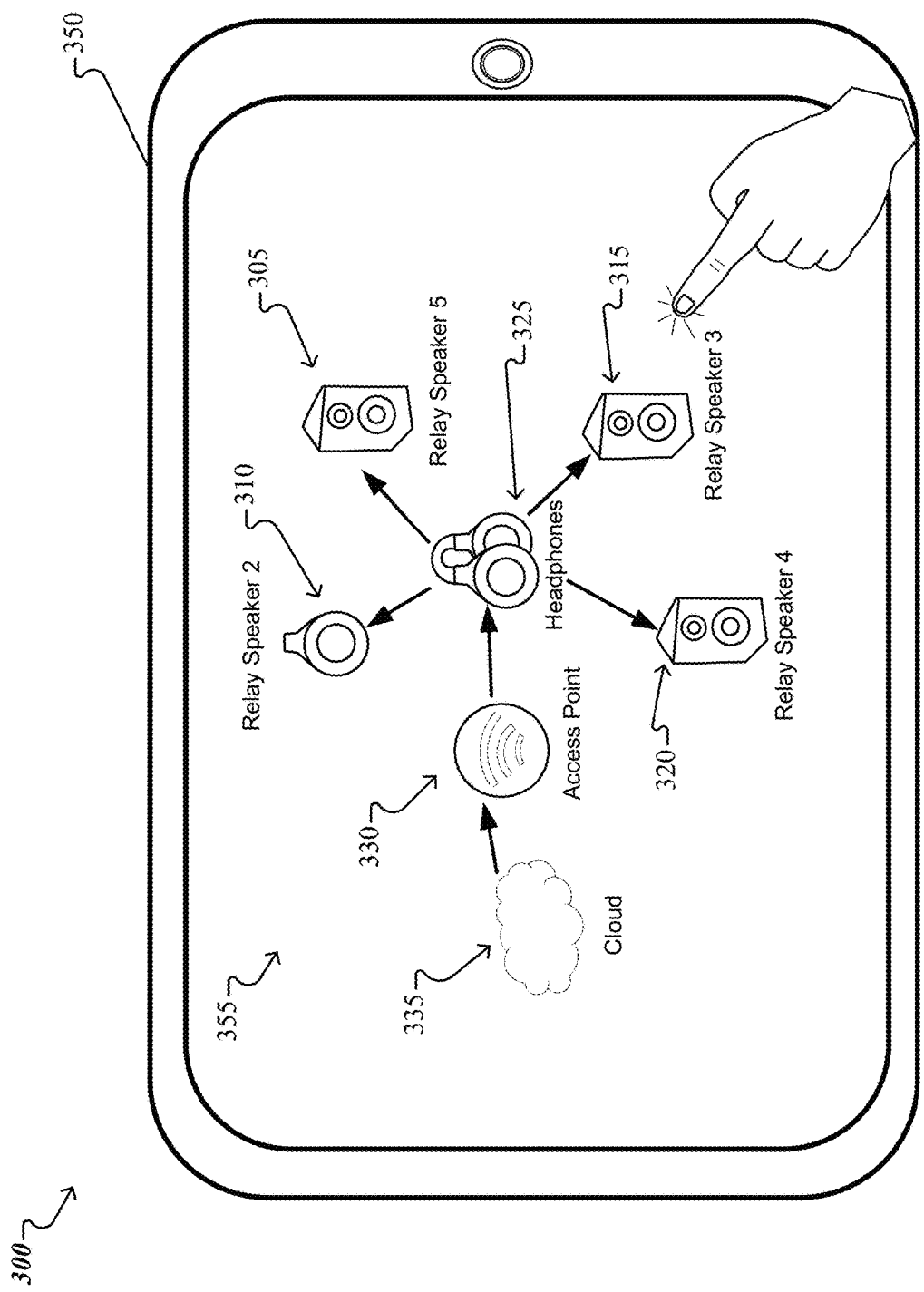
FIG. 3 is a conceptual diagram of a computing device, functioning as a remote controller, configured to implement the remote configuration, management, and network visualization techniques disclosed.

An IoT network device, or wireless node, refers to an information sensing device, e.g., a Radio Frequency Identification (RFID) apparatus, an infrared radial sensor, a Global Positioning System (GPS) device, a laser printer or scanner, or relay speakers and headphones (as shown in FIG. 3), among others. The IoT network device includes a network interface and is capable of being connected to other local IoT network devices, e.g., through a WLAN, and/or to remote IoT network devices, e.g., through the Internet. By connecting various IoT network devices through a network, the IoT devices can be managed remotely for sharing information collected by the various IoT devices, and/or the operations of the IoT network devices can be controlled based on the shared information. In some cases, a wireless node is implemented as a 802.11 STA, not necessitating IoT capabilities.

A bridge as disclosed herein is a storage/forwarding network device that is configured to connect two or more wireless networks, such as two WLANS. A bridge can split a large wireless network into multiple network segments, or interconnect two or more wireless networks into a logical group, so that all connected network devices are allowed to access a resource located in one of the constituent wireless networks. The bridge forwards frames between multiple network segments or wireless networks by performing address translation at the data link layer. A bridge used in WLAN or Wi-Fi network is also referred to as a Wi-Fi bridge.

Figure 1:
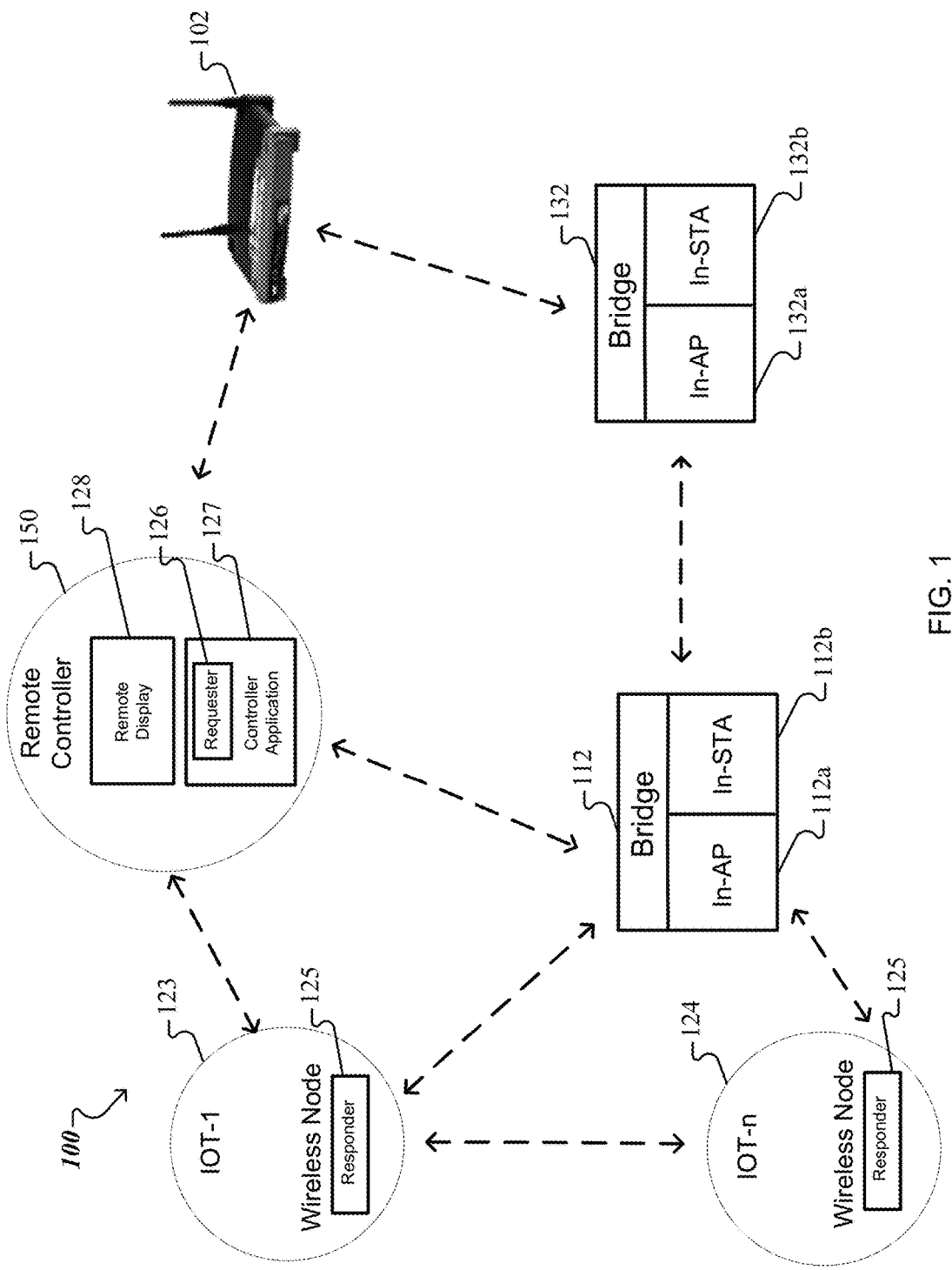
FIG. 1 shows an example of a wireless communication system used for implementing a bridge topology in Dynamic Multi Hop Relay (DMHR) wireless communication technologies.

FIG. 1 shows an example of a wireless communication system 100 with multiple bridges for wirelessly connecting network devices, according to the one or more implementations. The system 100 includes: a wireless network with an AP 102; one or more network devices, e.g., wireless node 123 and wireless node 124; one or more bridge devices, e.g., bridge 112 and bridge 132; and a remote controller device 150. In some cases, a network device has capabilities of both a bridge device and a wireless node device. Thus, in some instances, the wireless nodes 123, 124 can also function as bridge devices having the capability to directly (or indirectly) connect to AP 102 or each other.

In some implementations, the wireless network associated with the AP 102 is based on an IEEE 802.11 wireless network standard, and is operating in an infrastructure mode, e.g., various network devices in the wireless network establish connections with the AP 102 and communicate with other network devices using the AP 102 as an intermediate node. The AP 102 is a network device that is configured to act as a base station for the wireless network. The AP 102 transmits to and/or receives from, other network devices in the network, wireless radio frequency (RF) signals to facilitate communication with and among network devices. In some implementations, the AP 102 is a wireless router that is configured to route data and control packets between network devices.

Wireless nodes 123 and 124 are network devices that send and/or receive data in the wireless network. The wireless nodes 123 and 124 are illustrated as interconnected in the wireless network, enabling communication between the wireless nodes themselves, or with the other remaining devices on the network, e.g., remote controller 150, bridges 112, 132, and AP 102. In some cases, the wireless nodes are referred to as stations in the wireless network. In FIG. 1, the wireless nodes 123 and 124 are illustrated as IoT network devices (i.e., IOT-1 and IOT-n). For purposes of illustration, the wireless communication system 100 is shown to include wireless nodes 123 and 124, however it should be appreciated that varying numbers of wireless nodes can be included in the system 100 as deemed suitable for network characteristics and/or restrictions. The wireless nodes 123 and 124 are shown as having a responder 125, which is a program component installed on a computer-readable medium of the device (e.g., software or firmware included in wireless nodes 123 and 124). The responder 125 component is initialized as the corresponding wireless node joins the wireless basic service set (BSS), or as the wireless node is initiated (e.g., powered on). According to the disclosed techniques, the responder 125 component implements various command processing and acknowledgement aspects of a DMHR protocol, for instance transmitting response or ACK messages. The DHMR protocol supports communication between the wireless nodes 123, 124 and the remote controller 150. The DMHR protocol is discussed in greater detail in reference to FIGS. 2A-2B.

A remote controller 150 can be a network device that is configured to perform the remote configuration and management capabilities, as well as the network visualization capabilities, described herein. The remote controller 150 is implemented as a computing device having one or more display mechanisms suitable for implementing remote display 128. In some cases, the remote controller 150 is a wireless mobile device such as a laptop, tablet computer, personal digital assistant, or smartphone, which can be carried by a user (e.g., network administrator) in the vicinity of the wireless nodes 123, 124 used to access an internal wireless network via a bridge (e.g. bridge 112). Alternatively, the remote controller 150 can be a fixed device, such as a desktop or workstation. Also, in some cases, the remote controller 150 communicates remotely with wireless nodes 123, 124 via a connection to the external AP 120, e.g., through the Internet. Thus, although FIG. 1 illustrates remote controller 150 as located within the same LAN network, in some cases the remote controller 150 can be connected to the AP over the Internet, or function as a disconnected single entity within the range of one (or more) of the wireless nodes 123, 124 forming the network topology under control and configuration. The remote control can also communicate with one or more wireless nodes using 802.11 Media Access Control (MAC) messages piggybacked with the control protocol information. This communication can be with or without 802.11 association.

As described above and in the rest of this disclosure a larger wireless network, in which various stations and the bridges are present is referred to as an external wireless network, and a base station in the external wireless network is referred to as an external access point (Ext-AP). For example, the wireless network in which AP 102 is the access point is the external wireless network in the system 100, and AP 102 is the external AP. Local wireless networks formed by a bridge, for example bridge 112, using one or more of interfaces of the bridge are referred to as internal wireless networks of the bridge. As shown in FIG. 1, bridge 112 connects to an internal wireless network of the bridge 132 by connecting, through the In-STA 112*b* of the bridge, as a station to the In-AP 132*a* of the bridge 132. In this manner, two or more bridges can be connected in a chain or stacked configuration. Thus, the stacked configuration is used to connect network devices accessing the internal wireless network of bridge 112, which are a distance away from the Ext-AP 120, e.g., wireless nodes 123, 124.

The remote controller 150 is shown as having a requester 126, which is a program component installed on a computer-readable medium of the device (e.g., software or firmware included in remote controller 150). The requestor 126 is configured to implement the commanding aspects of the DMHR protocol, for instance generating (and transmitting) configuration and/or management commands. Additionally, the requester 126 implements various node discovery aspects of the DMHR protocol, such as transmitting broadcast discovery messages in order to identify responder(s) 125, and the associated wireless nodes e.g., wireless nodes 123, 124, that are present in the topology. In some embodiments, the AP 102 can include requester software.

FIG. 1 illustrates the remote controller 150 having a remote display 128. The remote display 128 is a display device that is enabled for the interactive visualization aspects of the disclosed techniques. As described above and in the rest of this disclose, the term "remote" referring to remote display 128 is used to mean physically separated from the IoT devices, such as wireless nodes 123, 124. A controller application 127 can be a program that presents a user interface (UI) on the remote display 128 of the remote controller 150, which can be operated using one or more input devices (e.g., keyboard and mouse). The remote display 128 can be implemented as a display device for a computer, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In some cases, the remote display 128 can have input mechanisms integrated therein (e.g., touchscreen), such as in a tablet computer.

For example, the remote display 128 can support a visual representation of the network topology, generated by plotting one or more wireless nodes that are identified during discovery (shown in FIG. 3). Further, the remote display 128 allows interaction with the displayed network visualization, in order to control and/or configure various wireless nodes of the topology. Interaction from a user, such as a network administrator, can be received by the remote display 128 to implement the systems and techniques of one or more embodiments.

Network devices, such as the remote controller 150 and wireless nodes 123,124 are computing devices that include a processor, which can be one or more hardware processors, which can each include multiple processor cores. Also, the network devices have memory, which can include both volatile and non-volatile memory, such as Random Access Memory (RAM) and Flash RAM. The network device can include various types of computer storage media and devices, which can include the memory, to store instructions of programs that run on the processor. Such programs can include the controller application 127 and the requester 126 component, which can run locally on remote controller 150. Programs can also include the responder 125 component(s) which can run locally on wireless nodes 123, 124. Alternatively, software can be run, or otherwise received (e.g., downloaded), remotely from a computer of one or more remote computer systems, or on a combination of one or more of each of the preceding.

In some implementations, the wireless nodes 123, 124 are outside of the direct signal range of the AP 102. In such cases, the wireless nodes 123, 124 are connected to the wireless network using one or more bridge devices, e.g., bridges 112 and 132. For example, the bridge devices 112 and 132 include two network interfaces: In-AP 112a, In-STA 112b; and In-AP 132a, In-STA 132b, respectively. The bridge devices 112, 132 are configured with the functionality to create and internal wireless network and use one network interface, e.g., In-AP 112a, as an access point in the internal wireless network. The bridge devices 112, 132 are also configured with the functionality to act as a station in another wireless network, e.g., the wireless network with the AP 102, using the other network interface, e.g., In-STA 112b. The bridges 112, 132 are configured to simultaneously operate one network interface (e.g., network interface 112a) as an access point in an internal network generated by the bridge 112, and operate another network interface (e.g., network interface 112b) as a station in an external wireless network generated by the AP 102.

FIG. 1 illustrates bridge 112 functioning as an access point, as wireless nodes 123, 124 are shown communication with bridge 112 in order to be further connected to a wireless network. The bridge 112 forwards bidirectional data between wireless nodes 123, 124 and the AP 102 through the network interfaces 112a, 112b. In this manner, the bridge 112 connects the wireless nodes 123, 124 to the external wireless network associated with the AP 102, with the bridge 112 as an intermediate network node. In some cases, the bridge 112 is not directly connected to the AP 102. Instead, the bridge 112 connects to the AP 102 through one or more other bridges, e.g., bridge 132.

Accordingly, bridge 112 forms an internal wireless network within a limited geographic proximity of the bridge 112 (e.g., using the In-AP 112a, which is configured to act as the AP for the internal wireless network). The network devices, wireless nodes 123, 124 and remote controller 150 are illustrated as being within the geographic range covered by the bridge 112, such that they can receive Received Signal Strength Indication (RSSI) for the internal wireless network from the In-AP 112a (e.g., over a certain acceptable signal threshold). The wireless nodes 123, 124 accordingly connect to In-AP 112a access point, and thereby act as stations in the internal wireless network formed by the bridge 112a. Furthermore, the remote controller 150 is capable of accessing wireless stations 123, 124 by using a direct wireless connection or connections established via bridge 112 (e.g., utilizing the In-AP 112a interface). Due to connectivity to a wireless network, for example the internal wireless network, the remote controller 150 can communicate with wireless nodes 123, 124, and subsequently perform network administrative actions, such as node discovery, configuration, and management.

FIGS. 2A-2B show examples of frame formats used for implementing a DMHR protocol for communication between the wireless nodes and a remote controller. As a general description, the DHMR protocol is a collection of messages and the mode of exchange of the messages between devices. DMHR protocol does not have a strong requirement of a reliable messaging service since every piece of communication is independently represented entirely in the transport message. The DMHR protocol can be used to communicate management information in a bridge network, thereby allowing an application having control and management capabilities to implement the disclosed remote managing, configuring, visualizing, and interacting aspects. For instance, in accordance with the DMHR protocol, a user can visualize the network topology in real-time, interact with the network, and manage it. Various capabilities supported by the DMHR protocol, include, but are not limited to: providing a discovery mechanism; providing a mechanism for addressing commands to individual nodes in the bridge topology; distinguishing between actions of a command; providing a mechanism for returning command response; and implementation with wireless network devices. The DMHR protocol is extensible to accommodate additional/unanticipated aspects of the bridge network operation and management (for example, future scopes for location information, real-time synchronization, and the like). The DMHR protocol is independent of the architecture and mechanisms of the particular network device devices. The DHMR protocol is independent of the transport medium, and thus able to transparently operate using 802.11 MAC, Ethernet, or IP layers.

According to the techniques described, frames of the DHMR protocol are formatted, or otherwise designed to allow for exchange between a requestor component, as implemented on the remote controller, and a responder component, as implemented on a wireless node. One or more frames generated by the requestor component can have the format shown in FIG. 2A. As shown in FIG. 2A, a frame 200 is formatted to include one or more fields including, but not limited to: command identifier (cmd_id) 205; sequence number (seq_num) 210; sub identifier (sub_id) 215; status 220; length 225; and command specific data based on the command identifier 230. For instance, the frame 200 can be transmitted as a command or discovery message from a requestor to be received by a specified responder, or group of responders. In the case of a discovery message, frame 200 can be transmitted as a discovery message broadcasted from a requester to all network devices within a geographic range, for instance within an internal wireless network. Accordingly, frame 200 can have a format that includes a value in the cmd_id 205 element indicating that frame as part of a discovery message. Also, the frame 200 can request data from its responders that is specific to performing discovery. For example, the command specific data based on cmd_id 230 element can indicate that a distance (e.g., from the requestor) associated with the responder, or wireless node, be provided as a response. Upon receiving one or more responses (e.g., unicast discovery response) based on frame 200 being received by responders during discovery, the requestor is then capable of maintaining a table of discovery data, for instance data corresponding to the command specific data based on cmd_id 230 element. Subsequently, data conveyed to the requestor in response to frame 200 can be used to build a network topology map containing all of the wireless nodes that responded to the discovery message.

In some embodiments, frame 200 is transmitted as a command message according to the DMHR protocol. In this case, frame 200 is formatted to implement various commands from the wireless controller in accordance with the remote configuration and management aspects of the disclosed techniques. As a general description, commands implemented using frame 200 can include two main types, configuration commands, and management commands. A configuration command is a type of command used to manipulate the wireless node configuration, in most cases without affected the wireless network topology. Type of configuration commands implemented by the DMHR protocol can include, but are not limited to: setting the transmission (TX) power of a wireless node; managing the power consumption of the wireless node; synchronizing clocks at the wireless node; restricting the use of particular wireless channels; configuring one or more BSS specific parameters; configuring Wi-Fi Multimedia (WMM) parameters; requesting neighbor report; and requesting current operating parameters in the network.

A frame 200 can be appropriately formatted so as to implement the specified configuration command. For instance, the cmd_id 205 element can be set to indicate that the reception of frame 200 is to invoke configuration of the transmission (TX) power of a wireless node. Furthermore, the command specific data based on cmd_id 230 element of frame 200 can convey information related to the command, such as a designated value for TX power of a wireless node.

A management command is a type of command used to manipulate the wireless network topology. Type of management commands implemented by the DMHR protocol can include, but are not limited to: dis-associating a wireless node from its parent node; triggering a network scan to identify access points available for association; transferring association of a wireless node to a different AP or bridge; and barring a station from the network. A frame 200 can be appropriately formatted so as to implement the specified management command. In some cases, a requester can be triggered to re-initiate the discovery protocol by a response from a responder that has received a frame 200 implementing a management command. For example, if the requester receives a confirmation message from a responder indicating that a management command was successfully executed, which potentially changed the network topology, the requester can re-initiate discovery to update the known topology. Then, a remote controller can generate an updated topology map displaying a current, or most recent, topology for the network.

In some implementations, frame(s) 200 is generated, or otherwise formatted, in response to user interactions received as input from the remote controller device (e.g., remote controller 150 in FIG. 1). A user can select an option provided by software installed on a remote controller, such as a remote controller application, to remotely configure and/or manage a wireless node shown in a visualization of the network topology. As an example, a network administrator can select a visual representation of a specific wireless node shown, in order to configure the device. Based on the received input, a corresponding frame 200 is formatted by the requester component in manner that is particular to the configuration command issued by the network administrator, and subsequently transmitted to the selected wireless node.

One or more frames generated by a responder component can have the format shown in FIG. 2B. As illustrated in FIG. 2B, a frame 250 is formatted to include one or more fields including, but not limited to: command identifier (cmd_id) 255; sequence number (seq_num) 260; sub identifier (sub_id) 265; status 270; length 275; and command specific response data based on the command identifier 280. In response to the responder component (as implemented in a wireless node) receiving a frame 200 (shown in FIG. 2A) from a remote controller, the responder can generally perform three main functions: transmit an acknowledgement (ACK) message to the requester including frame(s) 250; perform an action associated with discovery or a command specified by the frame 200; send a confirmation message, if required.

In some cases, the requestor and responder components agree on the formatting used in the DMHR protocol (e.g., communication handshake) for communication between wireless nodes and remote controller. The DHMR protocol provides various advantages, as it is not required to be tied to any particular wireless communication protocol, for instance tunneling can be used to transmit the frames of this protocol through any number of particular wireless communication protocols. Thus, the protocol can be transport medium agnostic. In some implementations, 802.11 MAC layer message action frames, can be used to implement the frames shown in FIGS. 2A-2B. In accordance with this implementation, the protocol data (e.g., command, acknowledgement, confirmation) can be included as a payload in an 802.11 action frame. In other implementations, 802.11 MAC layer message probe request management frame can be used to implement the frames shown in FIGS. 2A-2B. In using probe requests, the protocol data can be included in the information element (IE) of a probe request management frame. Additionally, in some instances, the 802.11 frames can be vendor specific.

Alternatively, User Datagram Protocol (UDP) packets are used to implement the exchange of data shown in FIGS. 2A-2B. As such, the DMHR protocol is implemented using UDP packets containing the protocol data (e.g., command, acknowledgement, confirmation) in the UDP payload of the request and response frames. Moreover, the disclosed techniques allow for the use of more than one transport medium in communication between the wireless node and the remote controller. For example, the transport medium used in communicating frames from the remote controller (e.g., remote controller 150 in FIG. 1) can differ from another transport medium used to transmit frames from the wireless node (e.g., wireless node 123 in FIG. 1).

Referring now to FIG. 3, a conceptual diagram of a mobile computing device 300, functioning as a remote controller, which is configured to implement the remote configuration, management, and network visualization methods described in this document. In the system, mobile computing device 300 can wirelessly communicate with various wireless nodes accessing a wireless network.

In FIG. 3, the mobile computing device 300 is depicted as a handheld mobile telephone (e.g., a smartphone, or an application telephone) that includes a touchscreen display device 350 for presenting content to a user of the mobile computing device 300 and receiving touch-based user inputs. Other visual, tactile, and auditory output components may also be provided (e.g., LED lights, a vibrating mechanism for tactile output, or a speaker for providing tonal, voice-generated, or recorded output), as may various different input components (e.g., keyboard, physical buttons, trackballs, accelerometers, gyroscopes, and magnetometers).

FIG. 3 depicts a visual input/output mechanism in the form of display device 350, functioning as a remote display, which is enabled for network visualization and providing interactive capabilities. The display device 350 can take the form of a display with resistive or capacitive touch capabilities, such as a touchscreen. The display device 350 is capable of displaying video, graphics, images, and text, and for coordinating user touch input locations with the location of displayed information so that the device 300 can associate user contact at a location of a displayed item with the item. The mobile computing device 300 may also take alternative forms, including as a laptop computer, a tablet or slate computer, a personal digital assistant, an embedded system (e.g., a car navigation system), a desktop personal computer, or a computerized workstation.

The mobile computing device 300 can determine a position of physical contact with the touchscreen display device 350 (e.g., a position of contact by a finger or a stylus). Using the touchscreen display device 350, various "virtual" input mechanisms may be produced, where a user interacts with a graphical user interface element depicted on the touchscreen 350 by contacting the graphical user interface element. An example of a "virtual" input mechanism is a "software keyboard," where a keyboard is displayed on the touchscreen and a user selects keys by pressing a region of the touchscreen display device 350 that corresponds to each key.

The mobile computing device 300 is shown presenting a graphical user interface (GUI) with the touchscreen display device 350. A graphical user interface is a collection of one or more graphical interface elements and may be static (e.g., the display appears to remain the same over a period of time), or may be dynamic (e.g., the graphical user interface includes graphical interface elements that animate without user input). According to the disclosed embodiments, a GUI for interactive wireless network visualization is provided by software installed on the remote controller, such as the controller application 127 shown in FIG. 1. As an example, a user can enable a controller application on the mobile computer device 300 (e.g., opening the software application), which automatically initiates a wireless node discovery protocol as disclosed herein. The discovery protocol is discussed in detail in reference to FIG. 4. Based on one or more wireless nodes identified during discovery, the mobile computer device 300 renders any association between the wireless nodes and generates a visual representation of the determined network topology on the touchscreen display device 350. FIG. 3 depicts an example of a network visualization 355 generated using the techniques disclosed herein and displayed on touchscreen display device 350. The network visualization 350 renders visual cues, or icons, to represent various elements discovered with a wireless network. In detail, the network visualization 355 illustrates a network topology for a wireless network. The visualization 355 includes GUI representations of the Internet 335 (e.g., cloud), and one or more network elements that are an access point 330, and wireless nodes 305, 310, 315, 320, 325 arranged in a manner to graphically represent the network topology.

The network visualization 355 is further capable of visually denoting details relating to the network topology and the devices therein, which can improve ease of performing network configuration and management for a network administrator. For example, specific icons representing the types of devices that correspond to wireless nodes present in the topology can be rendered, as shown. Network visualization 355 illustrates that an example network topology includes wireless nodes that are relay speakers 310, 305, 315, 320, and headphones 325. Additionally, network visualization 355 renders visual cues indicative of connectivity relationships of the topology, for instance headphones 325 is shown as a hub, connecting to AP 330 and each of the relay speakers 305, 310, 315, and 320. Connectivity relationships can be determined based on information queried from the wireless nodes, such as details of wireless associations, associations between wireless nodes within the wireless network. Discovery specific information that is received from wireless devices, and subsequently used in network topology determination and visualization can any information relating to the network topology as deemed necessary or suitable.

The visual representation 355 can also visually indicate spatial relationships associated with the network devices within the topology, such as a distance between devices. As an example, distance information (based on RSSI or by triggering any other protocol for deriving distance between wireless nodes) can be queried from a wireless node and then used to calculate a physical distance (e.g. in relation to an AP) associated with that wireless node. Based on respective distances for each of the wireless nodes, the placement of icons for those node within the visual representation 355 can be arranged to visually indicate the calculated distance between the various devices. For example, visual representation 355 places replay speaker 305 further in distance from access point 330 relative to headphones 325. Spatial relationships can be determined based on information queried from the wireless nodes, such as triangulation parameters including distance, direction, angle of arrival, and the like. Discovery specific information that is received from wireless devices, and subsequently used in network topology determination and visualization can any information relating to the network topology as deemed necessary or suitable. The techniques provide visualizations that are indicative of these device, spatial, and connectivity relationships, thereby allowing network management and configuration to be better adapted for the topology.

Also, the touchscreen display device 350 provides interactive capabilities with the network visualization 355. As depicted in FIG. 3, a user can touch one of the wireless nodes icons rendered on the touchscreen display device 350, and invoke one of the configuration or management commands, as described in detail referring to FIG. 2. The system and techniques described can support numerous interactions with the network visualization 355 that a user can perform through a GUI and touchscreen display device 350 to invoke manipulation of the network topology and devices. As another example, a user can touch and hold one of the icons for a wireless node, such as relay speaker 315, causing the GUI to display a menu of available management and configuration actions that can be used for the selected device. As yet another example, a "free form" touch input (e.g., drawing a geometric shape) can be entered using the touchscreen display device 350 allowing a user to select a group of wireless nodes in the network. Subsequently, a command can be transmitted to each of the multiple wireless nodes in the selection, effectuating a "collective commanding" capability. Examples of interactions that are supported by a network visualization 355 and the disclosed system include, but are not limited to: changing association of a wireless node (or group of nodes) in a wireless network, locking an association of a wireless node (or group of nodes) in a wireless network; real-time monitoring of the state of the wireless network; enforcing policies and network automation; monitoring and administrating the devices-mix of the network; and real-time wireless network mapping.

Additionally, the system and techniques described can support numerous other interactions with the network visualization 355 that are linked to, or other cause the execution of, the configuration and management commands as discussed in detail in reference to FIG. 2A-2B. Thus, interactions with the network visualization 355 can be designated for, but not limited to: setting the transmission (TX) power of a wireless node; managing the power consumption of the wireless node; synchronizing clocks at the wireless node; restricting the use of particular wireless channels; configuring one or more BSS specific parameters; configuring Wi-Fi Multimedia (WMM) parameters; requesting neighbor report; requesting current operating parameters in the network; dis-associating a wireless node from its parent node; triggering a network scan to identify access points available for association; transferring association of a wireless node to a different AP or bridge; and barring a station from the network. The list of interactions is not intended to be exhaustive, and multiple other interactions with the network visualization 355 can be implemented as deemed necessary and suitable.

The system and techniques disclosed define user interactions, received via an interactive GUI for visual representation 355, that effectuate specific remote management and configuration actions within a wireless network. One such interaction involves changing association of a wireless node (or group of nodes) in a wireless network. For instance, a user could perform drop and drag of an icon, such as icon 310 representing a network relay speaker to control change of its association. Initially, the user can use an input mechanism, such as a mouse, to hover over a designated area of the icon. The action of placing the mouse over the icon causes information relating to signal strength to be displayed, such as pop-up windows or description boxes indicating a signal strength of the access point the respective node is connected to. In some cases, hovering over the icon causes a query for the aforementioned signal strength to be transmitted. If the user finds that the signal strength is less than acceptable at a particular node, such as below a defined limit or threshold, changing the association of the wireless node can be desirable. Then, the user can perform a drag and drop of the icon to remotely change its association. The user can move the selected icon to another part of the screen, and drop it to another network device (e.g., a device having a greater signal strength). The drag and drop interaction with the icon causes the corresponding wireless node to change its association from the previous device (e.g., AP) to the newly selected device, as indicated by dropping the icon. Additionally, the user can select a group of nodes, or multiple icons, in accordance with the changing association described to collectively change their association (e.g., change their association to the same AP). In some cases, hovering over the icon automatically causes a query for the aforementioned state information to be received in real-time.

As another example, the system and techniques disclosed implement an interaction that locks an association of a wireless node (or group of nodes) in a wireless network. The user can select an icon, causing an additional output, such as pop-up windows or menu, which allows the user to enter input for locking the association for the node. The lock interaction can block the node from roaming to a different device for association, such as parent node or AP. In some cases, the lock can be induced for a particular period of time or it can be controlled on-demand. Additionally, the user can select a group of nodes, in accordance with the locking interaction described to collectively lock the nodes (e.g., lock their association to a single AP).

In another example, the system and techniques disclosed implement an interaction for real-time monitoring of the state of the wireless network. For instance, the user can use an input mechanism, such as a mouse, to hover over a designated area of the icon. The action of placing the mouse over the icon causes real-time state information relating to the wireless node to be displayed, such as pop-up windows or description boxes indicating a signal strength of the wireless node.

In another example, the system and techniques disclosed implement an interaction for enforcing policies and network automation. A user interaction can allow the user to enforce certain policies for network management. For example, the user can force an AP, such as AP 330, and its associated nodes to choose a higher bandwidth connection, when all nodes are capable of doing so. In some cases, transitioning to the new policy, such as the higher bandwidth, can be automated using a set of actions of script commands generated by the mobile computing device 300.

In yet another example, the disclosed system and techniques implement an interaction for monitoring and administrating the device-mix of the network. For instance, an interaction (e.g., tapping on an icon) can be performed which automatically causes a query of one or more network devices for information relating to a type or characteristic for determining the network's device-mix, or groupings of like devices. The information retrieved based on the interaction can be information deemed appropriate for grouping like devices into categories for the device-mix, such as manufacturing data, model, and the like. As an example, a network can have a determined device-mix based on a manufacturer category, and having three groups: group one including all network devices of manufacturer A; group two including all network devices of manufacturer B; and group three including all network devices of manufacturer C. Once the categories and groupings are determined, the visual representation 335 can be updated to reflect network topology by the device-mix, for instance placing icons for devices in the same category together a shared area of the display. Furthermore, based on the device-mix of the network, configuration and management action corresponding to devices of a specified type can be performed. For example, the lock association interaction can be performed on a group devices of a network device-mix, thereby preventing all devices from manufacturer A (e.g., not having certain security requirements) from joining the network.

In another example, the disclosed system and techniques implement an interaction for real-time network mapping. For instance, an interaction with the visual representation 335, such as selecting a "refresh" icon, can be performed which automatically causes a query of one or more network devices for discovery related information, including, but not limited to: device name; location; and triangulation parameters (e.g., distance, direction, angle of arrival). Response messages including substantially current, or most recent, discovery information can be received based on the interactive query, which allows the visual representation 335 of the network to be re-generated as a real-time mapping of the network topology. In some cases, information retrieved based on the real-time mapping interaction can be useful to other applications such as indoor Wi-Fi navigation, user preference profiling, etc.

Figure 4:
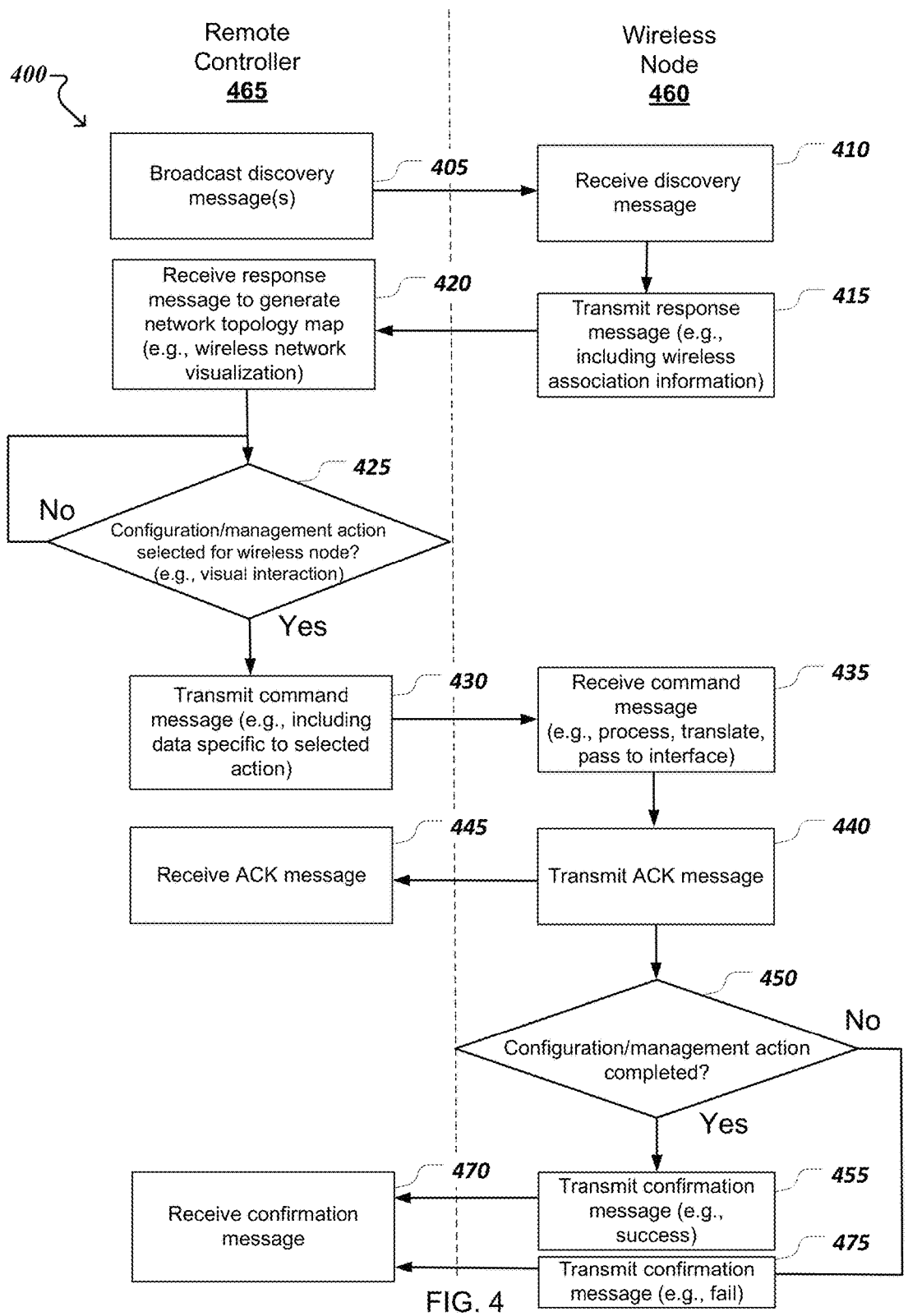
FIG. 4 shows an example of a process implementing the remote configuration, management, and network visualization techniques disclosed.

FIG. 4 shows an example of a process 400 implementing the described remote configuration and management techniques. The process 400 is implemented according to the DHMR protocol described in detail referring to FIG. 2. The process 400 includes steps for a communication handshake between a wireless node 460 and remote controller 465, utilized for discovery of a device in a network topology, and subsequent remote commanding of the device. The process 400 begins at 405 with a remote controller 465 capable of transmitting and receiving information using wireless networking technologies, such as DHMR, transmitting a discovery message to wireless node 460. In some implementations, the discovery message is a broadcast message that is transmitted to each of the wireless nodes within a geographic range covered by an access point or bridge. According to the disclosed techniques, the requester component (e.g., requester 126 in FIG. 1) of remote controller 465 generates the discovery message transmitted at 405. In some cases, the discovery message is automatically transmitted, as a function of initiating a remote controller software, as discussed referring to FIG. 3. In some cases, the remote controller 465 determines a particular transport medium to be used for transmitting the discovery message at 405, and formats the message accordingly. For instance, the remote controller 465 can determine that the discovery message will be communicated using an 802.11 MAC layer action frame.

At 410, a wireless node 460 receives the discovery message from remote controller 465. Wireless node 460 can be one of multiple wireless nodes receiving the broadcast from remote controller 465. In some cases, bridge devices forward the discovery message to its associated wireless nodes, or children nodes. Upon successfully receiving the broadcast discovery message, the wireless node can generate an associated response message. According to the disclosed techniques, the responder component (e.g., responder 156 in FIG. 1) of wireless node 460 generates the response message, in response to receiving the discovery message at 410. In some cases, each node unicast response to its associated bridge device or AP, referred to as a parent node, and a parent forwards the unicast response to parent from its IN-AP interface. The response message can include discovery specific information that has been requested by the remote controller 460, as conveyed in the received discovery message. The discovery specific information conveyed by the response message can include, but is not limited to: details of the node's wireless association; information indicating the node's association to other wireless nodes accessible via the wireless network (e.g., spatial, connectivity); and triangulation parameters (e.g., distance, direction, angle of arrival).

In some cases, the response message includes wireless association information usable to determine a network topology, such as information indicating specific device type, connectivity, and spatial relationships within the network. The wireless node 460, at 415, transmits the response message to remote controller 465. In some cases, wireless node 460 is capable of specifying a particular transport medium to be used for transmitting the response message at 415, and formats the message accordingly. For instance, the wireless node 460 can determine that the response message will be communicated using an 802.11 MAC layer action frame. It should be appreciated that the transport medium used by wireless node 460 can also differ from the transport medium used by the remote controller 465. Thus, providing a transport medium agnostic request and response exchange.

In some implementations utilizing the bridge network topology, the above discovery message exchange, initiated by step 405, will happen on a certain period. Since the broadcast can be unreliable, for example when the remote controller 465 does not have any bridge network topology information, it can be desirable for the remote controller 465 to re-issue discovery commands several times in a short time. Also, bridge devices have the capability to remember all children in order to reduce unnecessary broadcast command in following interactions. Wireless nodes can incrementally record each discovery response from all online bridge devices. In instances where a discovery response indicates a new MAC address device, it can further indicate that a new bridge device is online. Additionally, in some cases where a bridge device is determined to not be involved in the discovery message exchange, for example beyond three time periods, the bridge device can be changed to an offline status.

Thereafter, the remote controller 465 receives the response message at 420. Upon receiving the response message from wireless node 460, the remote controller 465 can utilize the discovery specific information conveyed therein to determine the network topology. For instance, the remote controller 465 can receive the response message from wireless node 460 in addition to response messages from other wireless nodes associated with the wireless network. Subsequently, the remote controller 465 can employ information from each of the nodes, including wireless node 460, to determine a wireless network topology, and render a network visualization as discussed referring to FIG. 3. For example, information indicating an association between wireless node 460 and at least one other wireless devices accessible via the wireless network, as indication by the response messages, can be used to arrange placement of the icon representing wireless node 460 in relation to that other device within the visual representation.

Next, at 425, the remote controller 465 determines whether a selection for a configuration and/or management action has been received. The selection can be received by the remote controller 465 as a user interaction with a network visualization in accordance with the interactive techniques disclosed herein referring to FIG. 3. The determination can involve identifying wireless node 460 as the specified node (or within a specified group of nodes) for performing a management or configuration action selected via the remote controller 465. For example, the remote controller 465 can display a visualization of a network topology including an icon representing wireless node 460. In some cases, the visualization is real-time wireless network mapping. After the visualization is displayed, the remote controller 465 is usable for issuing commands based on user interactions with the visualization. As an example, a user of the remote controller 465 can select an icon for wireless node 460, and further select a configuration action intended for wireless node 460, such as setting the TX power. In other cases, an interaction selects a management action that manipulates, or otherwise reconfigures, the network topology.

In instances where a configuration and/or management action has been selected for wireless node 460 (i.e., "Yes"), then the remote controller 465 can generate a corresponding command message. The particular command message is specified by a correspondence between the user's interaction with the visual representation and a configuration and/or management action to be commanded. For instance, the user According to the disclosed techniques, the requester component (shown in FIG. 1) of remote controller 465 generates the command message, based on the determination at 425. The command message can include a frame having a format specific to the selected configuration or management action, as discussed in detail referring to FIG. 2A. That is, the command message generated by remote controller 465 can include command specific information, for example data or instructions based on a command identifier related to a management or configuration action. In referring back to the example of setting the TX power, the command includes information indicating that the command is associated with a configuration action, such as an identifier (i.e., cmd_id) corresponding to controlling TX power, and data specific to the control of TX power, such as a value designating the transmission power for wireless node 460.

Thereafter, at 430, the command message is transmitted to wireless node 460. The command message is generated and transmitted, by remote controller 465, according to DMHR protocol. In some cases, the transport medium used for exchanging messages between remote controller 465 and wireless node 460 for the remote configuration and management techniques is transport media agnostic, as described in reference to FIGS. 2A-2B. For example, DMHR based messages can be encapsulated when 802.11 MAC is used as transport medium.

Alternatively, in instances where it has been determined that no configuration and/or management action has been selected for wireless node 460 (i.e., "No"), then the remote controller 465 can iteratively perform the check at 425. In this case, the wireless node 460 can wait until a command message is received from the remote controller 465.

At 435, the command message is received by the wireless node 460. Receiving the command message can involve the wireless node 460 processing the message and translating it to the locally required format of the configuration, or management, interface of the particular node. The processing and translating mechanism can be unique to each implementation of the wireless node. For example, devices implementing the disclosed techniques can be configured for the translation and processing to be performed by the firmware running on the system on chip (SoC). The protocol message is translated and processed to trigger the execution of appropriate code in firmware with appropriate parameters/ context_data which does the requested operation. In response to successfully receiving the command message at 435, the wireless node 460 proceeds to 440 and transmits an acknowledgement (ACK) message to the remote controller 465.

At 445, the remote controller 465 receives the ACK message from wireless node 460. In some cases, the remote controller 465 waits until an ACK message is received, confirming that the receive command was successfully transmitted to wireless node 460.

The wireless node 465 proceeds to 450, where a check is performed to determine whether the configuration, or management action, corresponding to the command message has been completed. In some cases, a requested command can control, or otherwise configure, a device specific characteristic or component. Therefore, the determination at 450 can involve considering various parameters, characteristics, and components of wireless node 460, relating to the requested action as deemed necessary or appropriate. Referring back to the example of setting the TX power, step 450 can involve obtaining operational measurements from a wireless transceiver of wireless node 460, to determine whether its TX power matches the value specified in the command message.

In instances where the action is determined to be completed at 450 (i.e., "Yes"), then the wireless node 460 can generate a confirmation indicating that the remote configuration, or management, action executed to completion. According to the disclosed techniques, the responder component (e.g., responder 125 in FIG. 1) of wireless node 460 generates the confirmation message. The confirmation message can include a frame having a format as discussed in detail referring to FIG. 2B. In some cases, the confirmation message includes a status code that denotes the status of the action (e.g., success). Subsequently, the wireless node 460 transmits the confirmation message at 455 to remote controller 465. In some cases, if the configuration management action is not completed based on the check at 450 (i.e., "No"), the process proceeds to 475 where a message is still transmitted from the wireless device 460 to the remote controller 465. In this instance, the message can also be a confirmation message (as in the action completed case), having a status code indicating that the wireless node 460 failed to complete the requested action (e.g., failure), and further including a description of an error.

At 470, the confirmation message is received by the remote controller 465. The remote controller 465 can be configured to retry transmission or otherwise re-transmit a command message, based on reception of the confirmation message. In a scenario where the confirmation message conveys to the remote controller 465 that a configuration, or management, action failed, a time duration or a threshold number can be used to implement retransmission attempts made for the command. As an example, the remote controller 465 can retransmit based on a retry counter, and will not retry transmission if the counter exceeds a maximum threshold. Thus, the techniques can address transmission errors that can be experienced in the wireless network from various sources (e.g., collision, bit error, etc.).

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Other implementations fall within the scope of the following claims.

What is claimed is:

1. A method comprising:
   determining a transport medium usable for communication of a discovery message via a wireless network, wherein the discovery message is formatted according to a protocol;
   transmitting one or more discovery messages using the determined transport medium;
   receiving one or more response messages associated with the one or more discovery messages via a second transport medium that is different from the transport medium used to transmit the one or more discovery messages formatted according to the protocol, wherein each of the one or more response messages is formatted according to the protocol and includes information indicating a wireless association between a wireless device corresponding to one of the one or more response messages and at least one other wireless device accessible via the wireless network, and wherein the wireless device accesses the wireless network via a bridge in response to the wireless device being out of range of the wireless network;
   determining a network topology of the wireless network based on the one or more response messages;
   generating a graphical user interface based on the determined network topology; and
   remotely controlling the wireless device using the graphical user interface by transmitting a control message to the wireless device via the bridge in response to the wireless device being out of range of the wireless network, wherein the control message is formatted according to the protocol.

2. The method of claim 1, wherein transmitting the discovery message is performed by a mobile computing device and the wireless network operates using a bridge topology.

3. The method of claim 1, wherein each of the transport mediums employs either an 802.11 Media Access Control (MAC) layer frame or a User Datagram Protocol (UDP) packet.

4. The method of claim 1, further comprising:
   generating a visual representation of the determined network topology comprising icons that represent wireless devices corresponding to the one or more response messages, wherein generating the visual representation comprises applying at least the information indicating the wireless association, from each of the one or more response messages, to arrange placement of the icons within the visual representation;
   receiving a user input from an interaction with the visual representation, wherein the user input selects at least one of the icons; and
   transmitting a command message to a wireless device represented by the selected icon, wherein the command message is specified based on a determined correspondence to the interaction with the visual representation.

5. The method of claim 4, wherein the command message manipulates a configuration of the wireless device represented by the selected icon, or manipulates the network topology associated with the visual representation.

6. The method of claim 4, wherein the determined correspondence specifies a change association command corresponding to an icon drag and drop interaction.

7. The method of claim 4, wherein the determined correspondence specifies a real-time monitoring of signal strength command corresponding to an icon hover-over interaction.

8. The method of claim 4, wherein generating the visual representation of the determined network topology comprises displaying a wireless network mapping.

9. The method of claim 4, wherein the command message controls a network interface of the wireless device to operate as an access point (AP) in the wireless network, and configures the network topology of the wireless network for connections to the network interface.

10. A system comprising:
    one or more wireless devices communicatively coupled with a wireless local area network (WLAN); and
    a remote controller device communicatively coupled with the one or more wireless devices, wherein the remote controller device is programed to:
       determine a transport medium usable for communication of a discovery message, wherein the discovery message is formatted according to a protocol;
       transmit, to the one or more wireless devices, one or more discovery messages using the determined transport medium;
       receive one or more response messages associated with the one or more discovery messages; from the one or more wireless devices via a second transport medium that is different from the transport medium used to transmit the one or more discovery messages, wherein each of the one or more response messages is formatted according to the protocol and includes information indicating a wireless association between a wireless device from the one or more wireless devices corresponding to one of the one or more response messages and at least one other wireless device accessible via the WLAN, and wherein the wireless device accesses the WLAN via a bridge in response to the wireless device being out of range of the WLAN;
       determine a network topology of the WLAN based on the one or more response messages;
       generate a graphical user interface based on the determined network topology; and
       remotely control the wireless device using the graphical user interface by transmitting a control message to the wireless device via the bridge in response to the wireless device being out of range of the WLAN, wherein the control message is formatted according to the protocol.

11. The system of claim 10, wherein the remote controller device is communicatively coupled with the at least one other wireless device via the WLAN, or via an external AP communicatively coupled with the WLAN.

12. The system of claim 10, wherein the remote controller device is a mobile computing device having a display device usable for: displaying a visual representation of the determined network topology comprising icons that represent wireless devices corresponding to the one or more response messages, wherein the visual representation is generated by applying at least the information indicating the wireless association, from each of the one or more response messages, to arrange placement of the icons within the visual representation.

13. The system of claim 12, wherein the display device is a touchscreen usable for: receiving a user input from an interaction with the visual representation, wherein the user input selects at least one of the icons to transmit a command message to a wireless device represented by the selected icon and the command message is specified based on a determined correspondence to the interaction with the visual representation.

14. The system of claim 10, wherein the WLAN operates using a bridge topology.

15. The system of claim 10, wherein each of the transport mediums employs either an 802.11 Media Access Control (MAC) layer frame or a User Datagram Protocol (UDP) packet.

* * * * *